United States Patent Office 2,863,800
Patented Dec. 9, 1958

2,863,800

1,3-DICHLORO-5,5-DIMETHYL HYDANTOIN COMPOSITIONS

Paul M. Gottfried, Washington, D. C.

No Drawing. Application September 16, 1952
Serial No. 309,898

7 Claims. (Cl. 167—33)

This invention relates to 1,3-dichloro-5,5-dimethyl hydantoin compositions having a high solubility rate, and processes for making same. The instant application is a continuation-in-part of applicant's original application filed July 26, 1950, Serial No. 176,065, now abandoned, entitled "1,3-Dichloro-5,5-Dimethyl Hydantoin Compositions."

1,3-dichloro-5,5-dimethyl hydantoin has long been known as a superior germicidal and oxidizing agent because of its high available chlorine content which is readily released in water and its lack of toxicity. Hitherto, however, it has not achieved extensive commercial application because of its slow solution rate. Although 2.1 grams of this chlorinated hydantoin will dissolve in a liter of water at 25° C., providing a high concentration of available chlorine, about an hour or more of continuous agitation is required for solution, or else heating must be resorted to. The solubility rate of the chlorinated hydantoin rises with increasing solvent temperature, but even at elevated temperatures its solution rate is slow. Under most circumstances it is advantageous to have a germicide and oxidizing agent which dissolves rapidly at ordinary temperatures. This is essential for any use requiring relatively large quantities of germicidal solution containing high concentrations of readily available chlorine, as for example, in sanitizing solutions for equipment for the food industry, in rinse solutions for dairies and bars, in desizing, oxidation and starch thinning operations as practiced in the textile industry, etc.

Because of its well-known superior germicidal and oxidizing characteristics, researchers in the prior art expended considerable effort in seeking a method of increasing the solution rate of 1,3-dichloro-5,5-dimethyl hydantoin. The patent to Peters, No. 2,422,255, discloses, for example, the incorporation of the non-chlorinated 5,5-dimethyl hydantoin with an equal amount of the chlorinated hydantoin for the purpose of increasing the rate of solution of the chlorinated hydantoin. Peters also disclosed the treatment of the chlorinated hydantoin with a "micronizer" for the purpose of increasing its rate of solubility. While the procedures disclosed by Peters, and by others, do effect an increase in the solution rate of the chlorinated hydantoin, it has nevertheless been ascertained that in each instance when such prior art procedure was employed a scum of unwetted or difficultly soluble material is formed upon the surface of the solution, which may remain for periods up to several hours after the addition to the water of the chlorinated hydantoin-containing composition. Furthermore, aggregates of difficultly soluble materials collect at the bottom of the solution, or remain suspended in the solution to produce turbidity. This scum formation is particularly prominent when micronized chlorinated hydantoin is employed, since the smaller particles of chlorinated hydantoin, in addition to forming aggregates, spread out rapidly upon the surface of the solution and are extremely difficult to wet.

Not only is this scum formation unsightly so as to merit the disapproval of potential users and health authorities, but its presence negatives any possibility of consumer acceptance for other reasons also. Articles such as dishes and glasses sanitized in chlorinated hydantoin-containing solutions free from floating films drain freely, and practically no smell or taste is imparted to them by the solution itself, whereas when floating scums are present solid particles of chlorinated hydantoin having an extremely strong chlorine odor and taste are picked up and carried out on the ware. Under these circumstances uneven drainage, streaking and spotting also results on drying of the ware, and is particularly objectionable in the case of glassware.

It is of interest to note that scum formation, as well as clarity of solution, are only indirectly related to solution rate, so that some compositions containing chlorinated hydantoin which have a fairly rapid solution rate are still commercially unacceptable due to the formation of scum, turbidity, or both.

An object of this invention is to provide 1,3-dichloro-5,5-dimethyl hydantoin compositions which dissolve so rapidly that aqueous solutions containing the chlorinated hydantoin in high, effective concentration may be obtained in an exceedingly short time, and proccesses for accomplishing same.

Another object of this invention is to provide 1,3-dichloro-5,5-dimethyl hydantoin compositions which dissolve rapidly in water to produce clear, scum-free germicidal solutions, and methods of making such compositions.

Other objects and advantages of my invention will become obvious from the following description.

I have discovered that when an intimately blended mixture of 1,3-dichloro-5,5-dimethyl hydantoin and a suitable wetting agent is comminuted to a maximum particle size of about 10 microns or less, the chlorinated hydantoin dissolves in water in amounts closely approximating its maximum solubility at the particular temperature within a matter of seconds or very little more than the length of time required to agitate the aqueous mixture in order to disperse the added chlorinated hydantoin composition. Furthermore, the solution thus formed is clear and is entirely free from surface scum. The rapidity of solution is not due merely to the fine particle size and the presence of the wetting agent, since mixtures of the chlorinated hydantoin and wetting agent blended subsequent to comminution do not have the remarkable solution-forming characteristics of the compositions comprising the present invention, particularly the ability to form clear, scum-free solutions. The reason why there should be this critical difference between comminuting the blended mixture of wetting agent and chlorinated hydantoin and blending the separately comminuted ingredients is not known. One hypothesis for explaining the observed phenomena is that when the mixture is subjected to the high frictional and shearing stresses required for minute subdivision, the frictional action between the particles of chlorinated hydantoin and the wetting agent results in comminuted particles substantially each of which contains both compounds in intimate contact with one another, and with the wetting agent largely coating the surface of the chlorinated hydantoin. Since wetting agents are, as a class, softer solids then the crystalline chlorinated hydantoin, in the course of the strong frictional action the wetting agent particles, in effect, rub off on the chlorinated hydantoin particles. Due to the presence of the wetting agent on the chlorinated hydantoin particles, with resulting high wettability, they come into immediate contact with a closely adhering film of water. This, in combination with the minute particle size results in substantially instantaneous solution. Whatever the explanation, the difference between the co-comminuted and separately comminuted mixture exists and is critical.

Any suitable device for accomplishing comminution of the mixture of chlorinated hydantoin and wetting agent to the requisite particle size may be employed, as for example, a hammer mill equipped with means for separating the particles of the desired size from the larger particles and returning the larger particles for further subdivision. Such conventional means as a ball mill may be employed satisfactorily if the milling period is extended sufficiently to effect the desired degree of comminution. Particularly suitable for my purpose are jet or air mills, frequently called micronizers, which accomplish exceedingly fine pulverization, to submicron size if desired, by several laterally impinging, high pressure jets of air. Comminution of the particles is due to the high frictional action both between the particles and the air moving at high velocity and between the rapidly moving particles. Separation of particles of the desired size from larger particles is readily accomplished by means of an upwardly moving air jet which forces the particles upwardly in a rapidly rotating vortex wherein separation may be effected by centrifugal action. The finer particles are forced upward and inward the furthest and are removed by a suitable separating means. The heavier particles are returned to the comminuting chamber and are further comminuted. By regulating the pressure of the upwardly moving jet, along with certain other factors, separation can be made of particles of any desired size. The advantage of the air micronizer for my purpose lies in its efficient comminuting action and the high degree of friction between the particles, which results in a superior product for some reason that is not readily apparent.

For purposes of substantially instantaneous solubility, namely, within a few seconds to about a minute after dispersion of the chlorinated hydantoin compound in water, the particle size should be a maximum of about 10 microns, and should average preferably below 6 microns. Larger particle sizes take considerably longer to dissolve, possibly because of a relatively large, hard core of chlorinated hydantoin in the individual particle, so that after solution of the wetting agent at the surface of the particle, a core of this chlorinated hydantoin remains as a particle of appreciable size which is slow to dissolve. The chlorinated hydantoin particles about 6 or less microns in diameter, when included in compositions comprising my present invention, dissolve within about 2 to 3 seconds after dispersion. There is no appreciable slowing of solution rate even at concentrations approaching saturation.

Any suitable wetting agent may be employed which is chemically inert with respect to the chlorinated hydantoin. Anionic, nonionic and cationic wetting agents have been found to be operable in the present invention, but the anioic wetting agents are by far the best because of their greater stability in the presence of the chlorinated hydantoin and their all-around performance. The alkylarylsulfonates, and particularly isopropyl naphthalene sulfonate, have been found to combine excellent wetting properties with desirable low-foaming characteristics. So far as can be determined, the latter type wetting agents appear to be completely inert as respects the chlorinated hydantoin, and produce exceptionally good use solutions.

In order to determine the compatability of the chlorinated hydantoin with a large number of wetting agents, a master batch of the following composition was first prepared:

| | Parts by weight |
|---|---|
| 1,3-diohloro-5,5-dimethyl hydantoin | 280 |
| NaCl | 300 |
| Na$_2$SO$_4$ | 360 |
| NaH$_2$PO$_4$ | 50 |

The above materials were ground in a mortar until uniformly blended. To 39.6 grams of the master batch was added 0.4 grams of the wetting agent set forth in the table below, and the complete formula again ground in a mortar to obtain thorough blending and further grinding. Twenty gram portions of these completed formulas were then placed in open, 4-ounce, wide-mouthed jars and held in an oven at 110° F. for one series of tests, while other open jars were placed in a humidor at 104° F. and 75% relative humidity. The available chlorine content, expressed in parts per million, of these compositions was determined on an as-is basis at various intervals. The results of these tests are set forth in the following table:

EFFECT OF WETTING AGENT ON AVAILABLE CHLORINE CONTENT OF CHLORINATED HYDANTOIN COMPOSITION

| Wetting Agent | Oven—110° F. Days Exposed | | | | | Humidor—104° F., 75% R. H. Days Exposed | | |
|---|---|---|---|---|---|---|---|---|
| | 0-3 | 20-22 | 45-91 | 101-127 | 348-385 | 25-41 | 54-64 | 90-97 |
| Master Batch [1] | 17.4 | 18.9 | 16.9 | 15.9 | 12.0 | 14.2 | 16.8 | 12.9 |
| ANIONICS | | | | | | | | |
| Isopropyl napthalene sulfonate | 17.9 | 18.7 | 17.0 | 15.8 | 13.1 | 13.5 | 16.8 | 13.6 |
| Sodium napthalene sulfonate (propylated) | 17.3 | 18.1 | 18.4 | 15.5 | 11.4 | 16.0 | 15.8 | 13.0 |
| N-methyl oleyl tauride sodium sulfate | 18.1 | 18.7 | 17.2 | 17.1 | 13.7 | 15.0 | 16.8 | 13.7 |
| Sodium sulfonate of oleic acid ethyl ester | 17.9 | 17.3 | 17.1 | 16.2 | | 11.9 | 13.3 | 11.7 |
| Dioctyl ester of sodium sulfosuccinic acid | 18.2 | 18.7 | 17.0 | 16.3 | 12.5 | 14.1 | 15.2 | 14.4 |
| Diisobutyl ester of sodium sulfosuccinic acid | 18.0 | 17.5 | 17.4 | 16.5 | | 12.2 | 11.9 | |
| Trihexyl ester of sulfotricarbollylic acid | 17.5 | 19.3 | 17.4 | 16.7 | | 13.0 | 14.1 | 12.9 |
| Diisobutyl phenol diethylene oxide sodium sulfonate | 18.5 | 19.1 | 17.4 | 16.1 | | 12.9 | 13.2 | 11.3 |
| Sodium kerylbenzene sulfonate | 17.7 | 18.0 | 15.5 | 15.5 | 11.4 | 11.7 | 14.9 | 9.4 |
| Sodium alkyl sulfonate | 17.8 | 17.6 | 16.7 | 15.8 | | 13.3 | 14.0 | 9.7 |
| Nitrosyl sulfonate of an unsaturated hydrocarbon | 17.3 | 17.7 | 17.2 | 15.5 | | 12.7 | 13.7 | 11.0 |
| Sodium xylene sulfonate | 18.4 | 18.7 | 17.1 | 17.2 | | 17.9 | 16.1 | 10.2 |
| Fatty alcohol sulfate | 18.4 | 16.8 | 14.6 | | 11.3 | 14.7 | 12.1 | 8.7 |
| Ammonium salt of sulfonated monoglyceride of coconut oil | 18.2 | 18.0 | 16.6 | | 13.2 | 16.1 | 10.6 | |
| Sodium salt of condensed aryl sulfonic acid | 18.4 | 17.6 | 15.6 | | | 14.6 | 11.5 | |
| Alkylol amine salt of fatty acids | 19.7 | 18.5 | 16.9 | | | 14.5 | 11.5 | |

[1] The control composition without wetting agent.

EFFECT OF WETTING AGENT ON AVAILABLE CHLORINE CONTENT OF CHLORINATED HYDANTOIN COMPOSITION.—Continued

| Wetting Agent | Oven—110° F. Days Exposed | | | | | Humidor—104° F., 75% R. H. Days Exposed | | |
|---|---|---|---|---|---|---|---|---|
| | 0-3 | 20-22 | 45-91 | 101-127 | 348-385 | 25-41 | 54-64 | 90-97 |
| CATIONICS | | | | | | | | |
| Cetyl pyridinium chloride | 19.1 | 17.6 | 13.5 | 10.7 | | 13.9 | 9.7 | |
| Alkyl (C$_8$-C$_{18}$) dimethyl benzyl ammonium chloride | 18.7 | 16.2 | 13.9 | 9.5 | | 13.2 | 10.5 | |
| Diisobutyl phenoxy ethoxy ethyl dimethyl benzyl ammonium chloride monohydrate | 18.8 | 17.7 | 17.1 | 14.8 | | 13.5 | 9.1 | |
| NONIONICS | | | | | | | | |
| Isooctylphenol condensed with 11¼ ethylene oxide mols | 17.7 | 17.3 | 15.3 | 14.0 | | 14.5 | 15.2 | 12.2 |
| Nonylphenol condensed with about 10 enhylene oxide mols | 16.7 | 17.7 | 16.0 | 14.9 | | 15.2 | 14.6 | 9.9 |
| Polyethylene glycol tertiary dodecyl thioether | 17.9 | 16.3 | 14.9 | 13.9 | | 12.4 | 11.7 | |
| Polyoxyethylene ester of mixed fatty and rosin acids (tall oil) | 18.4 | 15.1 | 13.9 | 13.3 | | 11.6 | 10.2 | |
| Polyoxyethylene diether of a polyoxypropylene glycol | 18.5 | 14.1 | 13.2 | 11.5 | | 10.0 | 9.1 | |

It is apparent from the above table that all of the anionic wetting agents tested, as well as certain of the nonionic and cationic wetting agents, are relatively inert as respects the chlorinated hydantoin. The anionic wetting agents are clearly the most desirable class of wetting agents for use in my invention. The nonionic and cationic wetting agents are preferred in the order named, since the cationic wetting agents appear to be the most susceptible to decomposition in contact with the chlorinated hydantoin. Certain inconsistencies in the test results set forth in the above table will be understandable when the difficulty of obtaining uniform sampling is recognized.

In most instances, I have found that about 1% of the wetting agent based on the weight of the entire formulation is sufficient, although smaller amounts will produce compositions satisfactory for many uses. The difficulty of adding these smaller amounts resides in obtaining adequate and uniform dispersion of the wetting agents throughout the composition, so that it is preferred to employ at least 1% of the wetting agent. Considerably larger amounts of wetting agent work very well, but are not preferred because of their relative high cost and because the excessive foam which occurs with these higher concentrations of wetting agent is undesirable for most of the applications to which compositions of my invention may be put.

Although the mixture of chlorinated hydantoin and wetting agent made according to my process dissolves with the desired rapidity when dispersed in water, it possesses a characteristic which in some cases may be somewhat disadvantageous from a practical standpoint. When added gradually it is readily dispersed through the water, as for example, with a few turns of a stirrer. However, when it is added quickly in large batches there is some tendency for it to form wet, gummy masses which float on the surface of the water and are very difficult to disperse.

I have found that the undesirable agglomeration at the surface which occurs when the chlorinated hydantoin-wetting agent mixture is added to water in bulk, is entirely eliminated when a very soluble salt such as sodium or potassium chloride is included in the blend prior to comminution. The entire amount of the chlorinated hydantoin composition containing the salt can be dropped into water and disperses at once with slight agitation of the solution as by swirling or stirring. The mechanism of the salt action is somewhat obscure, but whatever the actual action of the soluble salt may be, its addition does avoid agglomeration at the surface. The process is undoubtedly facilitated by the intimate commingling of the salt, chlorinated hydantoin and wetting agent accomplished by comminution of the blended mixture.

Although other inorganic salts of relatively high solubility which do not form crystalline hydrates may be used, I prefer to use sodium chloride both on the basis of performance and from practical considerations of cost. Potassium chloride also gives excellent results but is relatively expensive. Salts which form crystalline hydrates, although functioning to prevent caking or gelation of the chlorinated hydantoin-wetting agent compositions, themselves tend to form hard, interlacing crystalline structures which cause massing of the composition on the surface of the water with consequent dispersion difficulties.

Because of the deliquescent nature of sodium chloride, the chlorinated hydantoin compositions should be stored in airtight containers since, otherwise, under conditions of relatively high humidity, the absorbed moisture may cause decomposition of the chlorinated hydantoin.

To prevent or reduce moistening of the composition and to permit open storage without undue deterioration, a soluble anhydrous salt may be added with the sodium chloride prior to comminution. By anhydrous salt is meant a salt which reacts with water to form a crystalline hydrate. Anhydrous sodium sulfate is particularly suitable for my purpose. It cannot be employed as a substitute for the sodium chloride because, in admixture with the chlorinated hydantoin and wetting agent, there is some tendency to form slowly soluble, hard crystalline masses unless the composition is sifted slowly into the water. This is particularly true when the water is cold, which is a normal use condition. However, when anhydrous sodium sulfate is used in admixture with sodium chloride, formation of these gelatinous masses is avoided.

Since the sodium chloride or equivalent soluble salt acts primarily as a diluent, the amounts employed may vary considerably and is influenced by such factors as the proportion of wetting agent in the composition. Materially larger proportions than 1% of the formula weight of wetting agent may increase to some extent the tendency to form agglomerates when the chlorinated hydantoin composition is dropped into water quickly, so that under such circumstances it is desirable to increase the amount of the salt proportionately.

Similarly, the amount of soluble anhydrous salt such as anhydrous sodium sulfate may be varied over a large range of concentration, depending upon such factors as the amount of sodium chloride in the mixture which determines the amount of moisture likely to be taken up, the conditions of humidity likely to be encountered, and the like.

If desired, acidic buffering agents, such as monosodium acid phosphate, may be incorporated into the mixture to regulate the pH of the aqueous solution. The buffering agent should be incorporated with the other components of the mixture prior to comminution. However, buffering agents such as the monosodium acid phosphate, do not influence the solution rate and from that point of view may be omitted without adversely or otherwise affecting the substantially instantaneous solubility of my new chlorinated hydantoin compositions as above described.

As above set forth, the compositions comprising the present invention are characterized by extremely rapid rate of solution and produce water solutions substantially free from scum. Although these two phenomena are easily observable, they are not readily susceptible to numerical measurement. Consequently, the following detailed test procedures have been developed for empirically assessing these properties.

*Solubility rate procedure*

A sample of the composition to be tested is added to 200 ml. of distilled water in a sintered glass filtering funnel in an amount sufficient to produce 500 p. p. m. of chlorine in the solution. Immediately upon addition of the sample to the distilled water, a circular wire gauze stirrer is put into operation, and is mechanically reciprocated up and down in the sintered glass funnel for a period of 10 seconds (20 strokes). The length of stroke is so regulated that the wire gauze stirrer just clears the bottom of the funnel and just breaks the surface of the solution.

After the stirring is stopped, vacuum is applied to the funnel and a 100 ml. sample of the solution immediately drawn off and titrated in the usual manner to determine the available chlorine content. The solution rate, as determined by this procedure, is expressed in parts per million of available chlorine, with 500 representing complete solution.

*Funnel test procedure for floating residues*

The sample composition to be tested, in an amount sufficient to provide 400 p. p. m. available chlorine, is washed into a 250 ml. separatory funnel with 250 ml. water, shaken and allowed to stand for one minute. Pyrex Funnel No. 6400 is specified and should be selected to show a drainage time of 30–50 seconds. At the end of one minute, the stopcock is opened and the funnel drained, leaving the foam and other residues on the funnel wall. One minute after drainage is completed, the funnel is photographed and the number of square millimeters covered by foam or particles is measured by placing over the photograph of the funnel a grid divided off into squares, one millimeter on each side. Two photographs of each funnel are taken at right angles to each other and the average coverage based upon these two photographs, to a 1:1 photographic magnification, is recorded as the "funnel test, mm.² covered."

In order to enable those skilled in the art to more readily practice and to understand the present invention, the following examples are set forth in detail. Throughout these examples all references to micronized products, unless otherwise specified, relate to materials having an average particle size of approximately 3 microns. Also, the sodium salt of isopropyl naphthalene sulfonate was employed as a wetting agent throughout and is merely referred to in the examples generically as "wetting agent." The words "formula mixture," as set forth in the following examples, refers to the following composition:

| | Percent by weight |
|---|---|
| 1,3-dichloro-5,5-dimethyl hydantoin | 25 |
| Sodium isopropyl naphthalene sulfonate | 1 |
| Anhydrous $NaH_2PO_4$ | 5 |
| Anhydrous $Na_2SO_4$ | 39 |
| NaCl | 30 |

In all combinations of the chlorinated hydantoin with wetting agent, with or without additional ingredients, such as sodium chloride, sodium sulfate, etc., these ingredients were always tested in the proportions to one another as set forth in the above formula.

EXAMPLE 1

The remarkable and unexpected results obtained by employing compositions of the present invention are clearly set forth in the following table, wherein various compositions were tested employing the above identified solubility rate procedure and funnel test procedure:

| Sample Composition | Solubility Rate, p. p. m. of Available Chlorine | Funnel Test, mm.² Covered |
|---|---|---|
| Untreated chlorinated hydantoin | 81 | 845, Run 1. |
| Micronized chlorinated hydantoin | 306 | 1,500, Run 2. |
| Micronized mixture of chlorinated hydantoin and wetting agent. | 400 | 20, Run 3. |
| Micronized formula mixture | 470 | 19, Run 4. |

It will be apparent from the above table that micronization of the chlorinated hydantoin results in considerable increase in the rate of solubility, but the scum characteristics of the micronized chlorinated hydantoin are much worse than those of the untreated chlorinated hydantoin. In comparing runs 1 and 2, it should be noted that the scum formed in run 2 was uniform in contrast with the localized agglomerates covering a much smaller area formed in run 1. When the chlorinated hydantoin is co-comminuted with the wetting agent, however, the solubility rate is still further increased and there is a most remarkable reduction in scum formation, as shown in run 3. The micronized formula mixture dissolves to the extent of 94% within 10 seconds and is substantially free from scum. Runs 3 and 4 are indistinguishable, although the rate of solution of the complete formula is greater than that of the composition containing only the chlorinated hydantoin and wetting agent.

In this connection, it should be noted that a funnel test rating of approximately 50 or under must be obtained for a composition to be considered acceptable.

EXAMPLE 2

In order to produce the compositions of the present invention, and to practice the method herein disclosed, it is necessary that the chlorinated hydantoin and wetting agent be blended prior to micronization, rather than subsequent thereto. The criticalness of this limitation is set forth in the following table:

| Sample Composition | Solubility Rate, p. p. m. of Available Chlorine | Funnel Test, mm.² Covered |
|---|---|---|
| Chlorinated hydantoin and wetting agent, separately micronized and subsequently blended. | 350 | 837, Run 5. |
| Chlorinated hydantoin and wetting agent, comicronized. | 400 | 20, Run 3. |
| Formula mixture, ingredients separately micronized and subsequently blended. | 416 | 358, Run 6. |
| Comicronized formula mixture | 470 | 19, Run 4. |

In each instance, comicronization of the blended mixture resulted in a higher solubility rate than when the ingredients were separately micronized and subsequently blended. The most remarkable distinction, however, resides in the remarkable reduction in scum formation due to the comicronization procedure. A comparison of run 3 with run 5, and run 4 with run 6, at once makes strikingly apparent the remarkable result achieved by applicant's method and novel compositions of matter. It is thus shown that it is critical that the wetting agent and the chlorinated hydantoin be co-comminuted, rather than merely blending the separately micronized materials subsequent to micronization.

EXAMPLE 3

I have found that the particle size of the hydantoin and wetting agent mixture is critical, as is clearly evident from the following table:

| Sample Description | Average Particle Size | Maximum Particle Size | Solubility Rate [1] | Funnel Test, mm.² Covered |
|---|---|---|---|---|
| Chlorinated hydantoin and wetting agent, comicronized | 4 | | 400 | 20 |
| Do | 12 | | 304 | 1063 |
| Formula mixture, comicronized | 2 | 4 | 470 | 19 |
| Formula mixture, hammermilled | 4 | 8 | 465 | 7 |
| Do | 6 | 8 | 441 | 27 |
| Formula mixture, comicronized | 10 | 15 | 391 | 433 |
| Do | 15 | 20 | 277 | 820 |

[1] Parts per million of available chlorine.

Those skilled in the art are well aware of the fact that accurate determination of particle sizes in the ranges above specified is difficult, so that the particle sizes specified are only approximate. Acceptable compositions, however, have not been obtained when particle sizes larger than 10 microns were present in significant amounts, so that compositions comprising my present invention are restricted to those containing the chlorinated hydantoin and wetting agent in mixtures in which the maximum particle sizes do not materially exceed 10 microns.

EXAMPLE 4

The following table discloses the effect of the formulation upon solubility rate and scum formation:

| Sample Composition | Solubility Rate | Funnel Test, mm.² |
|---|---|---|
| Micronized chlorinated hydantoin | 306 | 1500 |
| Comicronized chlorinated hydantoin and wetting agent | 400 | 20 |
| Comicronized chlorinated hydantoin, wetting agent and NaCl | 438 | 5 |
| Comicronized chlorinated hydantoin, wetting agent, NaCl and Na₂SO₄ | 450 | 30 |
| Comicronized formula mixture | 470 | 19 |

The most remarkable increase in solubility rate and decrease in scum formation is achieved by combining the chlorinated hydantoin with the wetting agent. The addition of sodium chloride, sodium sulfate, and buffering agent increase the rate of solution still further and assist in diminishing the amount of scum and foam.

The above examples are set forth by way of explanation and not limitation. Permissible variations in ingredients, proportions, particle size, etc. are to be determined in the light of the entire specification, and as specifically defined in the attached claims.

What is claimed is:

1. A composition comprising an intimately blended mixture of 1,3-dichloro-5,5-dimethylhydantoin, a wetting agent, a soluble inorganic salt which does not react with water to form crystalline hydrates and a soluble inorganic anhydrous salt, said wetting agent, inorganic salt and anhydrous salt being normally solid and being chemically inert with respect to said 1,3-dichloro-5,5-dimethylhydantoin, the ingredients in said mixture being co-comminuted to a maximum average particle size not greater than about 10 microns.

2. A composition comprising an intimately blended mixture of 1,3-dichloro-5,5-dimethylhydantoin, a normally solid wetting agent comprising an alkylarylsulfonate, sodium chloride and anhydrous sodium sulfate, the ingredients in said mixture having been co-comminuted to a maximum average particle size not greater than about 10 microns.

3. A composition comprising an intimately blended mixture of 1,3-dichloro-5,5-dimethylhydantoin, a normally solid wetting agent comprising isopropylnaphthalene sulfonate, sodium chloride and anhydrous sodium sulfate, the ingredients in said mixture having been co-comminuted to a maximum average particle size not greater than about 10 microns.

4. A composition comprising an intimately blended mixture of 1,3-dichloro-5,5-dimethylhydantoin, a wetting agent, a soluble inorganic salt which does not react with water to form crystalline hydrates, a soluble inorganic anhydrous salt, and an acidic buffering agent, said wetting agent, inorganic salt, anhydrous salt and buffering agent being normally solid and being chemically inert with respect to said 1,3-dichloro-5,5-dimethylhydantoin, the ingredients in said mixture having been co-comminuted to a maximum average particle size not greater than about 10 microns.

5. A process for increasing the solution rate of 1,3-dichloro-5,5-dimethylhydantoin which comprises, admixing the chlorinated hydantoin with a wetting agent, a soluble inorganic salt which does not react with water to form crystalline hydrates and a soluble inorganic anhydrous salt, said wetting agent, inorganic salt and anhydrous salt being normally solid and being chemically inert with respect to said chlorinated hydantoin, and frictionally comminuting the mixture to a maximum average particle size not greater than about 10 microns.

6. A process for preparing a composition containing 1,3-dichloro-5,5-dimethylhydantoin and characterized by a rapid rate of solution and ability to produce aqueous solutions substantially free from scum, which comprises, admixing the chlorinated hydantoin with a normally solid wetting agent comprising an alkylarylsulfonate, sodium chloride and anhydrous sodium sulfate, and frictionally comminuting the mixture to a maximum average particle size not greater than about 10 microns.

7. A process for increasing the solution rate of 1,3-dichloro-5,5-dimethylhydantoin which comprises admixing the chlorinated hydantoin with a wetting agent, a soluble inorganic salt which does not react with water to form crystalline hydrates, a soluble inorganic anhydrous salt and an acidic buffering agent, said wetting agent, inorganic salt, anhydrous salt and buffering agent being normally solid and being chemically inert with respect to said chlorinated hydantoin and frictionally comminuting the mixture to a maximum average particle size not greater than about 10 microns.

References Cited in the file of this patent

UNITED STATES PATENTS

| | | |
|---|---|---|
| 1,562,821 | Bunds | Nov. 24, 1925 |
| 1,968,628 | Alton | July 31, 1934 |
| 2,181,800 | Crossley | Nov. 28, 1939 |
| 2,318,439 | Waldron | May 4, 1943 |
| 2,422,255 | Peters | June 17, 1947 |
| 2,477,492 | Moose | July 26, 1949 |

FOREIGN PATENTS

| | | |
|---|---|---|
| 12,955 | Great Britain | of 1905 |